United States Patent

Morio

[15] 3,639,685

[45] Feb. 1, 1972

[54] SIGNAL SUPPLYING CIRCUIT FOR A COLOR PICTURE TUBE

[72] Inventor: Minoru Morio, Tokyo, Japan

[73] Assignee: Sony Corporation, Tokyo, Japan

[22] Filed: Oct. 1, 1969

[21] Appl. No.: 862,889

[30] Foreign Application Priority Data

Oct. 7, 1968 Japan....................................43/72980

[52] U.S. Cl. ....................................178/5.4 MA, 178/5.4 SD

[51] Int. Cl. ............................................................H04n 9/50

[58] Field of Search...............178/5.4 SD, 5.4, 7.5 E, 5.4 MA

[56] References Cited

UNITED STATES PATENTS 3,499,104 3/1970 Austin ....................................178/5.4

3,506,776 4/1970 Rennick............................178/5.4 SD

OTHER PUBLICATIONS

" Color T.V. Processing Using Integrated Circuits" IEEE tran BTR 12 Nov. 66

*Primary Examiner*—Robert L. Griffin

*Assistant Examiner*—Richard P. Lange

*Attorney*—Lewis H. Eslinger, Alvin Sinderbrand and Curtis, Morris & Safford

[57] ABSTRACT

In a signal supplying circuit for a color picture tube, the luminance signal component of a color signal is divided into a high-frequency component and a low-frequency component, the low-frequency component is supplied to a demodulator for the chrominance signal component of the color signal so that the output of the demodulator which is supplied to the output amplifier contains the demodulated chrominance signal component mixed with the low-frequency luminance signal component, and the high-frequency luminance signal component is separately applied to an input of the amplifier for mixing in the output of the latter with the chrominance signal component and the low-frequency luminance signal component so as to constitute therewith a complete color video signal for application to a color picture tube.

9 Claims, 2 Drawing Figures

Figure 1:
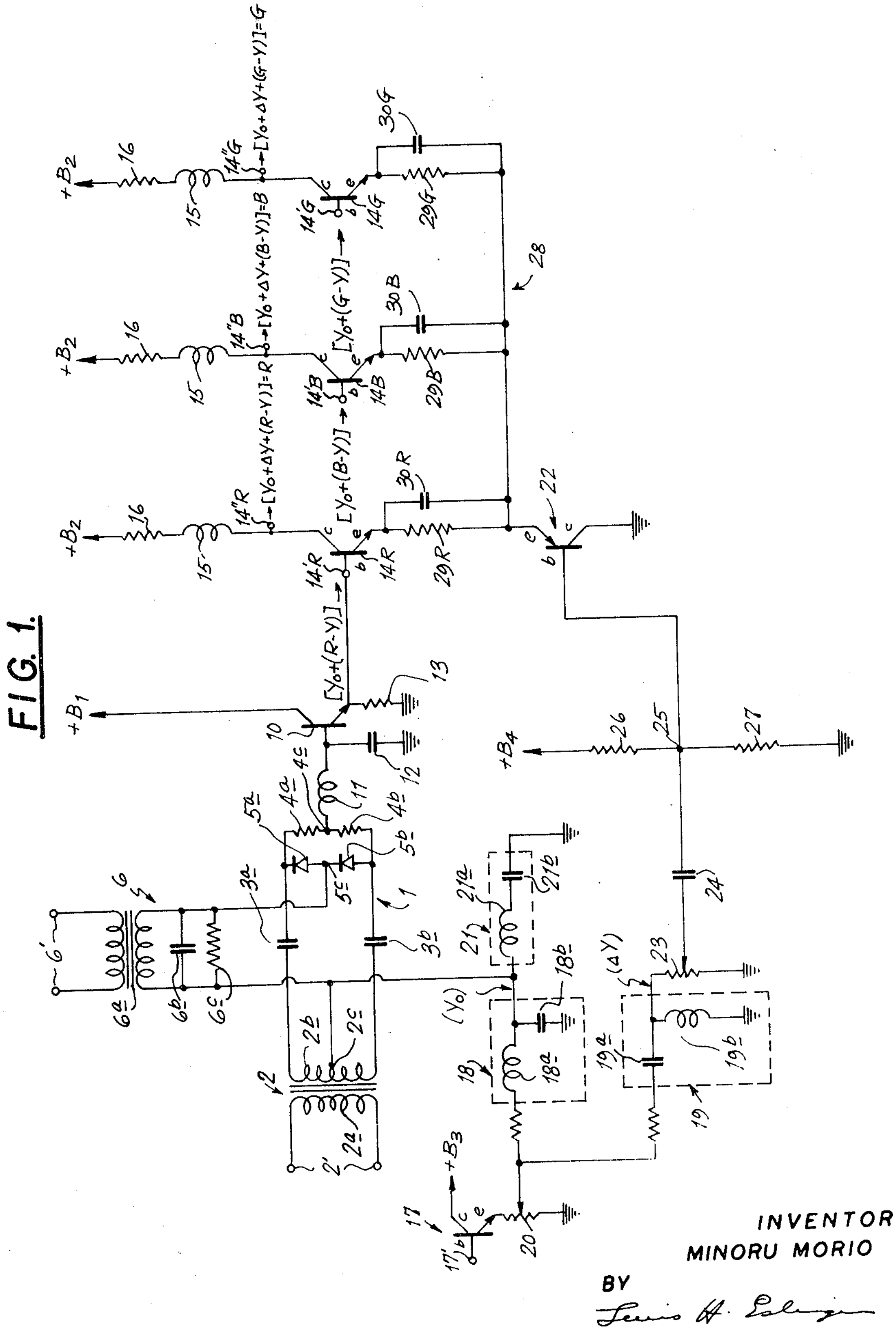

INVENTOR
MINORU MORIO
BY
ATTORNEY

INVENTOR
MINORU MORIO
BY
ATTORNEY

SIGNAL SUPPLYING CIRCUIT FOR A COLOR PICTURE TUBE

This invention relates generally to color television receivers, and more particularly is directed to improvements in the circuits of such receivers by which color signals are supplied to the color picture tubes thereof.

In a color television receiver, a color video signal which is received by an antenna and then converted to an intermediate frequency, is separated into a chrominance signal component and a luminance signal component. These chrominance and luminance signals are independently amplified and demodulated because their carriers have frequencies that are different from each other.

One or the other of two basic arrangements may be employed to supply the demodulated chrominance and luminance signals to the color picture tube so as to obtain the display of color images on the face of the tube. In accordance with one of these arrangements, the demodulated chrominance and luminance signals are separately supplied to respective electrodes provided on the color picture tube and are substantially compounded in the tube so as to obtain the desired color images. Such arrangement is disadvantageous in that it results in a signal supply circuit that is relatively complicated and further requires the provision of numerous electrodes on the color picture tube.

In the other of the possible arrangements for supplying the demodulated chrominance and luminance signals to the color picture tube, both the demodulated chrominance and luminance signals are compounded or mixed in the signal supply circuit so as to establish a color video signal which is then applied to a respective electrode of the color picture tube. This arrangement is relatively advantageous in that the signal supplying circuit for the color picture tube can be of relatively simple construction, and further in that control circuits for the tube, such as, a cutoff control circuit and the like, can also be of simple construction. As an example of the last-mentioned arrangement, it has been previously proposed to provide a signal supplying circuit for a color picture tube in which the luminance signal is supplied to a chrominance demodulating circuit so that the output of the latter contains both the demodulated chrominance signal and the luminance signal, and such output containing both the demodulated chrominance signal and luminance signal is then supplied to the color picture tube, as the color video signal, through a common output amplifier. However, the foregoing previously proposed arrangement of the signal supplying circuit for color picture tube has defects in that the high frequency part of the luminance signal is suppressed and not supplied to the color picture tube and, as a result, the resolution of the image displayed by the tube is deteriorated. Such deteriorated or inferior resolution of the image is particularly a problem in the case of large size color television receivers so that the previously proposed signal supplying circuit is not considered suitable for use in such large size receivers. The deterioration of resolution, as mentioned, results from the fact that the luminance signal has a broad frequency band with an upper frequency limit that is substantially higher than that of the chrominance signal so that, when the entire luminance signal is supplied to a chrominance demodulating circuit, the high frequency part of the luminance signal is stopped by the chrominance demodulating circuit and not transmitted through the output amplifier to the color picture tube.

Accordingly, it is an object of this invention to provide a relatively simple signal supplying circuit for a color picture tube by which high resolution of the color images is obtained.

Another object is to provide a signal supplying circuit which is suitable for use in large size color television receivers.

Still another object is to provide a signal supplying circuit for a color picture tube in which the demodulated chrominance signal and luminance signal are combined or compounded in the signal supplying circuit and supplied as a color video signal through a common output amplifier to the color picture tube without loss or suppression of the higher frequency part of the luminance signal, and hence without deterioration of the resolution of the resulting color images.

In accordance with an aspect of this invention, the luminance signal component of a color signal is divided, as by a high-pass filter and a low-pass filter, into a high-frequency component and a low-frequency component, the low-frequency component is supplied to a demodulator for the chrominance signal component of the color signal so that the output of the demodulator contains the demodulated chrominance signal component and the low-frequency luminance signal component, and such output of the demodulator and the high-frequency luminance signal component are separately applied to respective inputs of an amplifier which, at its output, contains the chrominance signal and the high- and low-frequency luminance signal components to constitute the complete color video signal to be supplied to the color picture tube.

Figure 2:
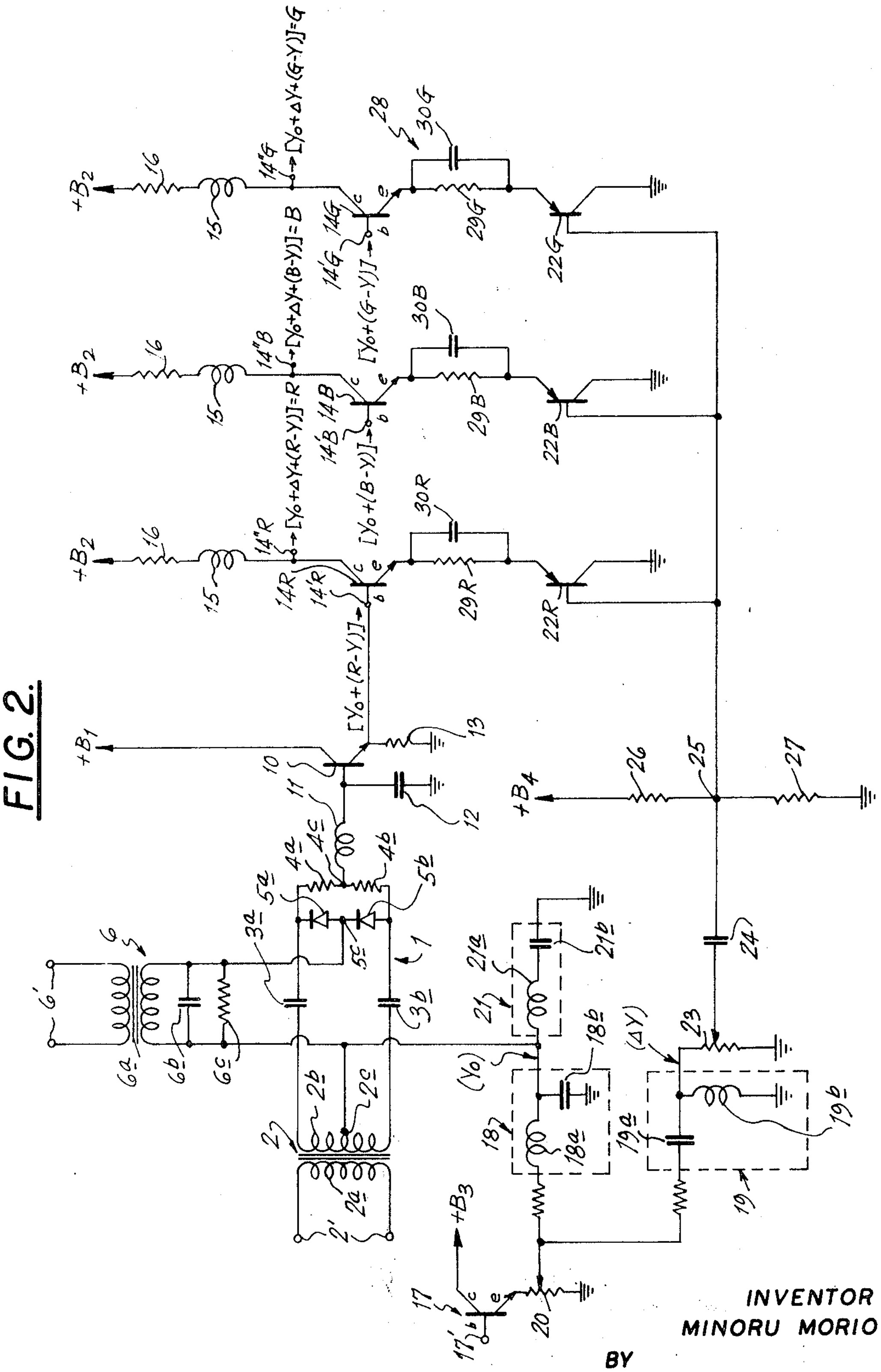

The above, and other objects, features and advantages of this invention, will be apparent in the following detailed description of illustrative embodiments of the invention which is to be read in connection with the accompanying drawings, wherein:

FIG. 1 is a schematic circuit diagram showing a signal supplying circuit for a color picture tube according to one embodiment of this invention; and FIG. 2 is a view similar to that of FIG. 1, but showing a circuit according to another embodiment of the invention.

Referring to the drawings in detail, and initially to FIG. 1 thereof, it will be seen that the signal supplying circuit for a color picture tube according to the embodiment of this invention there illustrated comprises a chrominance demodulating circuit 1 for a red chrominance signal (R–Y), and it is to be understood that corresponding chrominance demodulating circuits are provided for the blue chrominance signal (B–Y) and the green chrominance signal (G–Y), but are not shown on the drawing for the sake of simplicity. Each chrominance demodulating circuit 1 may be a balanced synchronous detector, for example, and as shown may comprise a transformer 2 having its primary winding supplied with a subcarrier signal, as at the terminals 2′, with the phase of such subcarrier signal corresponding to the respective chrominance signal to be demodulated, that is, having a phase corresponding to the red chrominance signal in the case of the illustrated circuit 1. Connected across the secondary winding *2b* of transformer 2 are capacitors *3a* and *3b*, diodes *5a* and *5b* and load resistors *4a* and *4b* in parallel with the latter. The modulated chrominance signal is supplied to a junction *5c* between diodes *5a* and *5b* by way of a band-pass filter 6 which is shown to include a transformer *6a* having its primary winding connected with terminals 6′ receiving the modulated chrominance signal from a band-pass amplifier (not shown), and a capacitor *6b* and resistor *6c* in parallel with the secondary winding of transformer *6a*. An inductor 11 extends from a junction *4c* between load resistors *4a* and *4b* to the base electrode of a transistor 10, which base electrode is further connected with ground through a capacitor 12, and such transistor 10 is provided to amplify the output signal from the chrominance demodulating circuit 1. It will be apparent that the chrominance signal supplied to terminals 6′ is demodulated in circuit 1 so that the output of the latter amplified by transistor 10 will contain the red chrominance signal (R–Y). The collector electrode of transistor 10 is connected with a bias voltage source $+B_1$, and the emitter electrode or output terminal of transistor 10 is connected to ground through a resistor 13 and further connected to the input or base electrode terminal 14′R of a transistor 14R which forms a video output amplifier for the amplified output of the circuit 1 which contains the demodulated red chrominance signal. Corresponding transistors 14B and 14G are provided to form video output amplifiers for the outputs of the demodulator circuits (not shown) which contain the demodulated blue and green chrominance signals, respectively, and which are applied to the input terminals 14′B and 14′G of transistors 14B and 14G, respectively. The collector electrode of each of the transistors 14R, 14B and 14G is connected with a bias voltage source $+B_2$ through an inductor 15 and resistor 16, and output terminals 14''R, 14''B and 14''G for the respective video output amplifiers are provided between the inductors 15 and the cathode electrodes of transistors 14R, 14B and 14G.

A transistor 17 acting as a luminance signal amplifier receives the luminance signal at a terminal 17' connected to its base electrode and has its collector electrode connected to a bias voltage source $+B_3$ so that the amplified luminance signal will appear at the emitter electrode of transistor 17. In accordance with this invention, the amplified luminance signal (Y) constituting the output of transistor 17 is divided into a low-frequency component ($Y_0$) of the luminance signal and into a high-frequency component ($\Delta Y$) of the luminance signal, with the low-frequency luminance signal component ($Y_0$) being supplied to each of the chrominance signal demodulating circuits 1 so as to be contained in the output thereof applied to the input terminal 14'R, 14'B or 14'G of the respective video output amplifier, while the high-frequency luminance signal component ($\Delta Y$) is supplied to a separate input terminal of each of the video output amplifiers 14R, 14B and 14G, as hereinafter described, so as to also be contained in the complete color video signal appearing at each of the output terminals 14''R, 14''B and 14''G.

In the embodiment of the invention illustrated by FIG. 1, the division of the luminance signal into a low-frequency luminance signal component ($Y_0$) and into a high-frequency luminance signal component ($\Delta Y$) is effected by a low-pass filter 18 and a high-pass filter 19 connected in parallel to the emitter electrode of transistor 17 by way of a variable resistor 20. The low-pass filter 18, as shown, may consist of an inductor 18*a* and a capacitor 18*b* combining to permit the passage to the output of the filter of only that component of the luminance signal below a specified frequency, for example, 1.5 MHz, and the high-pass filter 19, as shown, may consist of a capacitor 19*a* and an inductor 19*b* combining to permit the passage to the output of filter 19 of only that component of the luminance signal having frequencies in a specified range, for example, in the range between 1.5 MHz and 4.5 MHz. The low-frequency luminance signal component ($Y_0$) appearing at the output of low-pass filter 18 is supplied to a middle tap 2*c* provided on the secondary winding 2*b* of transformer 2 in each of the chrominance signal demodulating circuits 1, whereby to be mixed with the chrominance signal in each of the chrominance demodulating circuits. Further, the middle tap 2*c* of the secondary winding of transformer 2 in each chrominance demodulating circuit 1 is grounded through a circuit 21 consisting of an inductor 21*a* and capacitor 21*b* connected in series between the output of filter 18 and ground so as to operate as a trap circuit for the subcarrier having a frequency of 3.58 MHz.

In order to supply the high-frequency luminance signal component ($\Delta Y$) to the emitter electrodes of transistors 14R, 14B and 14G, the embodiment of this invention illustrated in FIG. 1 further includes a transistor 22 having its base electrode connected through a variable resistor 23 and a capacitor 24, in series, with the output of high-pass filter 19 and further having a junction 25 between its base electrode and capacitor 24 connected with resistors 26 and 27 extending to a voltage source $+B_4$ and ground, respectively, to apply a bias voltage to the base electrode. The collector electrode of transistor 22 is grounded and the emitter electrode of transistor 22 is connected through matrix circuits 28 constituted by parallel connected resistors and capacitors 29R and 30R, 29B and 30B, and 29G and 30G with the emitter electrodes of transistors 14R, 14B and 14G, respectively.

In the signal supplying circuit described above with reference to FIG. 1, the demodulated chrominance signals combined with the low-frequency luminance signal component $[Y_0+(R-Y)]$, $[Y_0+(B-Y)]$ and $[Y_0+(G-Y)]$ are supplied to the respective video output amplifiers constituted by transistors 14R, 14B and 14G at the base input terminals of such transistors, and are mixed, in such video output amplifiers, with the high-frequency luminance signal component ($\Delta Y$) which is also supplied through transistor 22 and the matrix circuits 28 to the emitter input terminals of transistors 14R, 14B and 14G. As a result, complete video output signals R, B and G, corresponding to red, blue and green images, respectively, are provided at the amplifier output terminals 14''R, 14''B and 14''G, respectively, and may be conveniently supplied therefrom to the color picture tube (not shown), for example, to respective cathodes of the tube.

Since only the low-frequency luminance signal component ($Y_0$) is combined with each of the demodulated chrominance signals in the respective demodulating circuit 1 and the high-frequency luminance signal component ($\Delta Y$) is applied to the video output amplifiers through the transistor 22 the complete video signals appearing at the output terminals of the video output amplifiers have the high-frequency component as well as the low-frequency component of the luminance signal combined with the respective color chrominance signal so that the resulting color images formed by the color picture tube will be of high resolution. That is, the high-frequency part of the luminance signal is not suppressed or lost, as would be the case if the entire luminance signal was applied to each of the chrominance demodulating circuits 1 for combination therein with the respective demodulated color chrominance signal.

Further, since only the high-frequency luminance signal component ($\Delta Y$) is supplied by way of the transistor 22 and such high-frequency component is of relatively small amplitude, the transistor 22 can be of a relatively inexpensive type having a small collector loss. It will also be apparent that, in the described circuit, the input level of the high-frequency luminance signal component ($\Delta Y$) may be easily controlled by way of the variable resistor 23 so as to change the frequency characteristic of the signal supplied to the tube in accordance with the color signal and the black and white signal that is received.

Referring now to FIG. 2, in which a signal supplying circuit similar to that described above with reference to FIG. 1 is shown and has its several parts identified by the same reference numerals, it will be seen that, in place of the single transistor 22 for supplying the high-frequency luminance signal component to the emitter input terminals of transistors 14R, 14B and 14G, there are provided individual transistors 22R, 22B and 22G. In FIG. 2, the high-frequency luminance signal component appearing at the output of filter 19 is applied through variable resistor 23 and capacitor 24 to the base electrodes of transistors 22R, 22B and 22G which have their emitter electrodes connected by way of the respective matrix circuits 28 with the emitter input terminals of transistors 14R, 14B and 14G, respectively. By reason of the foregoing, each of the transistors 22R, 22B and 22G can be of a type having even a smaller collector loss than that employed for the single transistor 22, and hence even less expensive that the latter.

It should be understood that, if the entire luminance signal was supplied to the transistor 22 (FIG. 1) or to the transistors 22R, 22B and 22G (FIG. 2), for combining with the demodulated color chrominance signals in the amplifying transistors 14R, 14B and 14G, the large amplitude of the low-frequency portion of the luminance signal would necessitate the use of extremely expensive transistors at 22 or at 22R, 22B and 22G. Thus, the circuits according to this invention achieve color video signals capable of producing high resolution of the resulting images while minimizing the cost and complexity of such circuits.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

I claim:

1. A signal supplying circuit for a color picture tube, comprising demodulating means for demodulating a chrominance signal component of a color signal, amplifying means having at least two signal input terminals to one of which the output of said demodulating means is supplied, means for dividing a luminance signal component of the color signal into a low-frequency component and a high-frequency component, means for supplying said low-frequency component to said demodulating means so that said output of the demodulating means contains the sum of the demodulated chrominance signal component and said low-frequency component, and means for supplying said high-frequency component to another of said input terminals of said amplifying means so that the amplified output of said amplifying means contains the sum of said high- and low-frequency luminance signal components added to said chrominance signal component to constitute a complete color video signal for application to a color picture tube.

2. A signal supplying circuit for a color picture tube according to claim 1, in which said means for dividing the luminance signal includes low-pass filter means having its output supplied to said demodulating means and high-pass filter means providing said high-frequency component as an output thereof.

3. A signal supplying circuit for a color picture tube according to claim 1, in which said means for supplying the high-frequency component includes at least one transistor having a grounded collector electrode, an emitter electrode and a base electrode to which said high-frequency component is applied, and matrix circuit means connecting said emitter electrode with said other input terminal of said amplifying means.

4. A signal supplying circuit for a color picture tube according to claim 3, in which a variable resistor is interposed between said high-pass filter and said base electrode of the transistor to permit variation of the level of said high-frequency component of the luminance signal in said output from the amplifier means.

5. A signal supplying circuit for a color picture tube according to claim 1, in which said demodulating means includes a plurality of chrominance demodulating circuits for demodulating respective color chrominance signals and to each of which said low-frequency component of the luminance signal is supplied for adding to the respective demodulated color chrominance signal, and in which said amplifying means includes a plurality of video output amplifiers each having a first input terminal to which the output of a respective one of said demodulating circuits is supplied and a second input terminal to which said high frequency component of the luminance signal is supplied.

6. A signal supplying circuit for a color picture tube according to claim 5, in which said means for supplying the high-frequency component includes a single transistor having a grounded collector electrode, an emitter electrode and a base electrode to which said high-frequency component is applied, and matrix circuit means connecting said emitter electrode to said second input terminal of each of said video output amplifiers.

7. A signal supplying circuit for a color picture tube according to claim 6, in which each of said video output amplifiers includes a transistor having a base electrode constituting said first input terminal, an emitter electrode constituting said second input terminal and a collector electrode at which said complete color video signal appears.

8. A signal supplying circuit for a color picture tube according to claim 5, in which said means for supplying the high-frequency component includes a plurality of transistors each corresponding to a respective one of said video output terminals, each of said transistors has a grounded collector electrode, an emitter electrode and a base electrode to which said high-frequency component is applied, and matrix circuit means connecting said emitter electrode of each of said transistors with said second input terminal of the respective video output amplifier.

9. A signal supplying circuit for a color picture tube according to claim 8, in which each of said video output amplifiers includes a transistor having a base electrode constituting said first input terminal, an emitter electrode constituting said second input terminal and a collector electrode at which said complete color video signal appears.

* * * * *